United States Patent
Mouw et al.

[11] Patent Number: 6,026,539
[45] Date of Patent: Feb. 22, 2000

[54] UPRIGHT VACUUM CLEANER WITH FULL BAG AND CLOGGED FILTER INDICATORS THEREON

[75] Inventors: Brandon L. Mouw, Wyoming; John J. Jailor, Rockford, both of Mich.

[73] Assignee: Bissell Homecare, Inc., Grand Rapids, Mich.

[21] Appl. No.: 09/034,375

[22] Filed: Mar. 4, 1998

[51] Int. Cl.$^7$ .............. A47L 5/00; G01F 15/00; G01L 19/12

[52] U.S. Cl. .............. 15/339; 96/421; 116/264; 116/268

[58] Field of Search .......................... 15/339; 55/DIG. 3, 55/372; 95/19, 20; 96/421; 116/264, 266, 268

[56] References Cited

U.S. PATENT DOCUMENTS

| | | |
|---|---|---|
| 2,034,373 | 3/1936 | Bilde . |
| 2,099,391 | 11/1937 | Gerber . |
| 2,198,888 | 4/1940 | Snyder . |
| 2,283,831 | 5/1942 | Taylor . |
| 2,634,819 | 4/1953 | Cranner . |
| 2,725,114 | 11/1955 | Brace . |
| 3,936,904 | 2/1976 | Bashark . |
| 4,020,525 | 5/1977 | Fromknecht et al. ........... 15/339 |
| 4,060,050 | 11/1977 | Simonsson ........... 15/339 |
| 4,199,838 | 4/1980 | Simonsson ........... 15/339 |
| 4,294,595 | 10/1981 | Bowerman ........... 15/339 |
| 4,481,692 | 11/1984 | Kurz . |
| 4,733,430 | 3/1988 | Westergren . |
| 4,733,431 | 3/1988 | Martin . |
| 4,955,103 | 9/1990 | Scott et al. ........... 15/339 |
| 5,201,095 | 4/1993 | Choi . |
| 5,778,486 | 7/1998 | Kim ........... 15/339 |

FOREIGN PATENT DOCUMENTS

| | | |
|---|---|---|
| 365191 A1 | 4/1990 | European Pat. Off. . |
| 2052298 | 1/1981 | United Kingdom . |

*Primary Examiner*—Robert J. Warden, Sr.
*Assistant Examiner*—Andrew Aldag
*Attorney, Agent, or Firm*—Rader, Fishman, Grauer & McGarrry,PLLC

[57] ABSTRACT

A vacuum cleaner comprises a housing having a floor-engaging nozzle fluidly interconnected with a filter bag in a closed filter bag chamber in the housing through a suction passageway, an exhaust vent in the filter bag chamber to exhaust filtered air exiting from the filter bag chamber and a vacuum motor provided in the housing to draw air from the floor-engaging nozzle to the filter bag. An exhaust filter is mounted in the exhaust vent. A sensor in the filter bag chamber detects a condition representative of the flow of air through the exhaust filter element and an exhaust filter indicator interconnected with the sensor provides a signal to a user when the condition reaches a predetermined level to indicate a clogged condition of the exhaust filter. A sensor and indicator can also be provided for the filter bag so that independent signals can be generated relating to the clogged condition of one or both of the filter bag and exhaust filter.

25 Claims, 3 Drawing Sheets

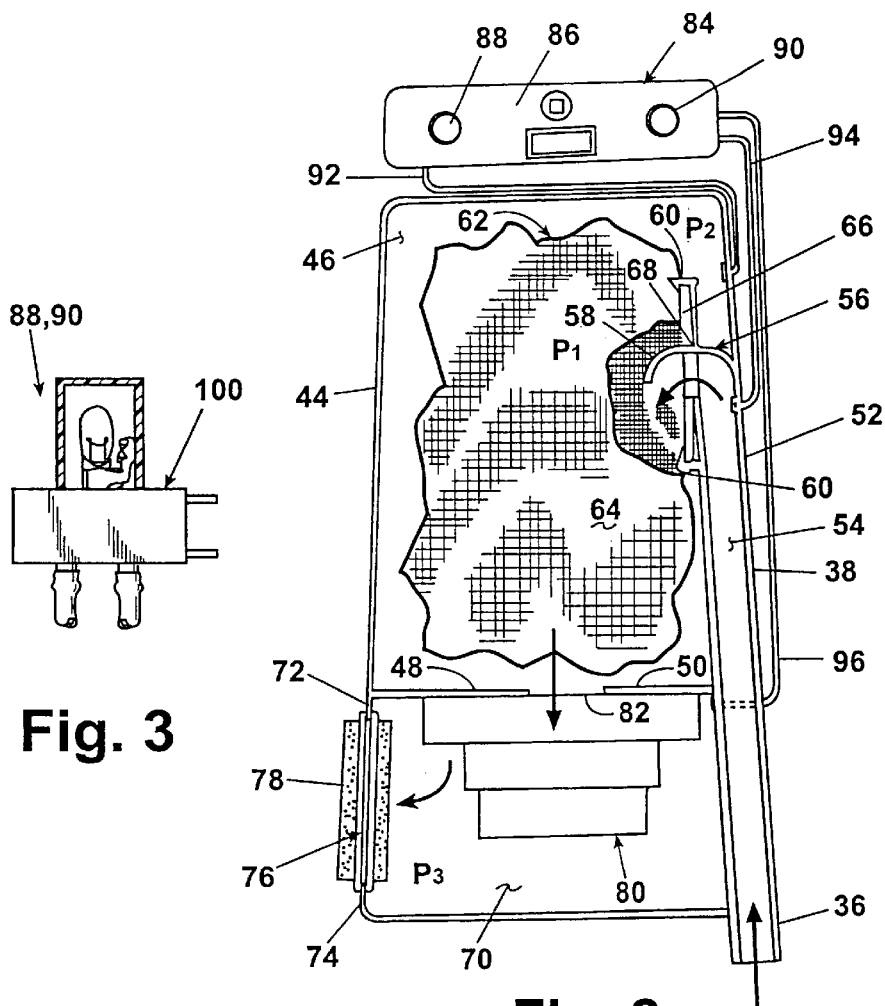
Fig. 3
Fig. 2
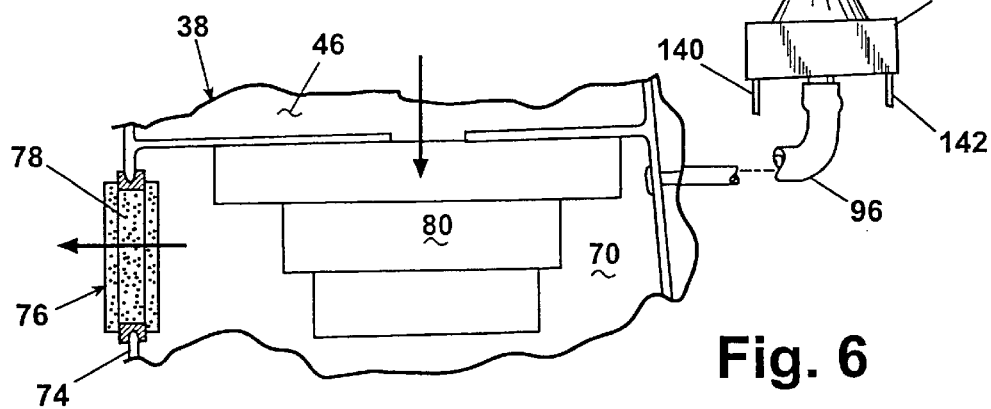
Fig. 6

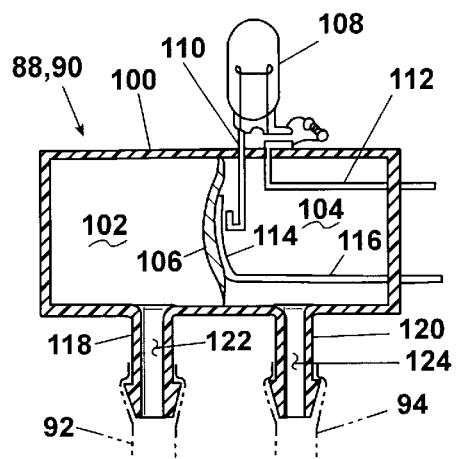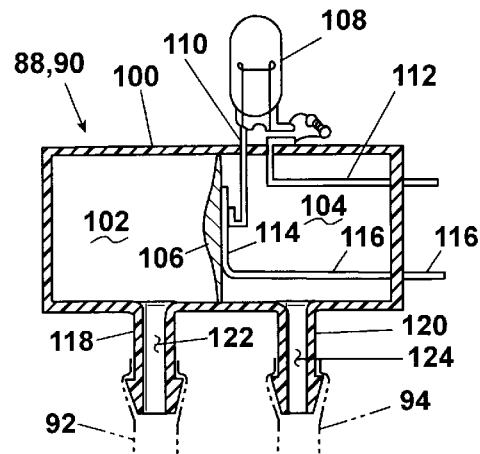
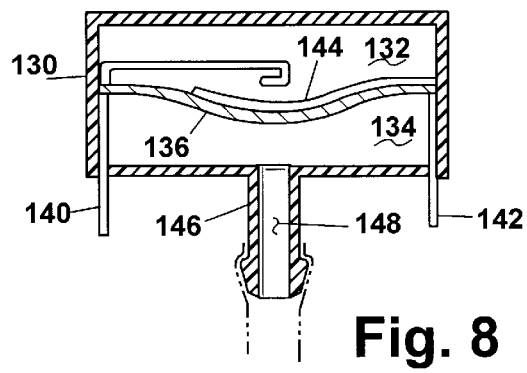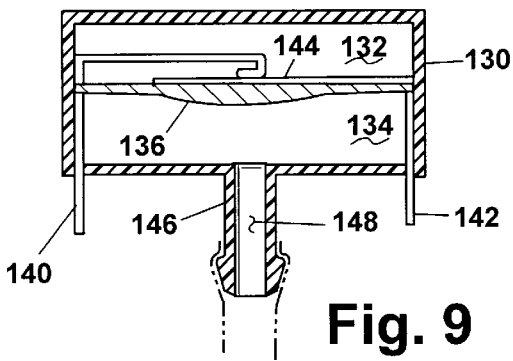
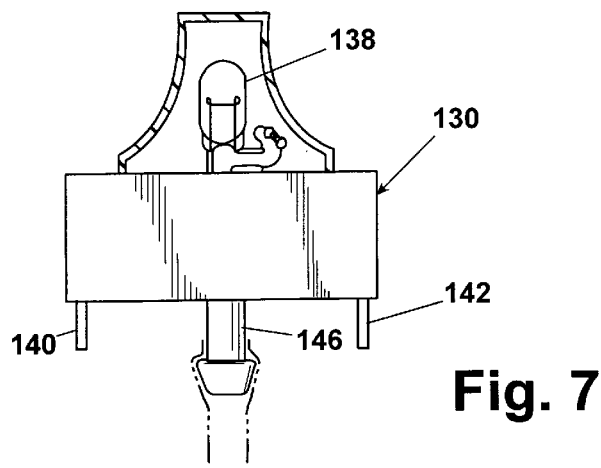

UPRIGHT VACUUM CLEANER WITH FULL BAG AND CLOGGED FILTER INDICATORS THEREON

BACKGROUND OF THE INVENTION

1. Field of the Invention

This invention relates to an upright vacuum cleaner and, more specifically, to an upright vacuum cleaner having indicators which display full filter bag and clogged filter conditions thereof.

2. Description of the Related Art

Upright vacuum cleaners comprise a floor-engaging nozzle having a pivotally-mounted handle thereon which can be driven by a user in an oscillating fashion over a floor surface to be cleaned. The nozzle typically has a suction opening having a rotating agitator brush driven by a motor. The motor also suctions debris loosened from the floor surface by the agitator brush through a suction passage in the nozzle. The suction passage has an inner end fluidly interconnected with a suction passage in the handle which terminates in a filter bag located within the handle.

Upright vacuum cleaners are typically classified as "clean-air" and "dirty-air" systems. Clean-air systems have the vacuum motor positioned downstream of the filter bag whereby suction applied by the vacuum motor to the filter bag pulls air through the suction passages in the nozzle and handle. Dirty-air systems have the vacuum motor positioned upstream of the filter bag whereby debris pulled into the suction passage in the nozzle is "blown" into the suction passage in the handle and, in turn, into the filter bag located therein. In either case, exhaust from the vacuum motor is typically dispensed from either the nozzle or the handle through louvered vents in the housing for the motor.

As debris accumulates within the filter bag, the vacuum motor is required to exert additional pressure on the filter bag in order to accumulate the debris loosened by the agitator brush therein. When a sufficient amount of debris has accumulated within the filter bag, a user must open the housing in which the filter bag is stored and replace it. Because the efficiency by which the vacuum cleaner removes debris from the floor surface is often difficult to ascertain by a user, it is desirable to provide the vacuum cleaner with an indicator which displays a clogged condition of the filter bag. Prior art filter bag indicators for a vacuum cleaner are shown by example in U.S. Pat. Nos. 4,733,430 (Westergren) issued Mar. 29, 1988, 4,733,431 (Martin) issued Mar. 29, 1988, 3,936,904 (Bashark) issued Feb. 10, 1976 and 5,201,095 (Choi) issued Apr. 13, 1993.

However, the filter bags located within the vacuum cleaner typically have a predetermined porosity. Thus, debris particles smaller than the porosity of the filter bag are allowed to pass through the filter bag and out of the vents in the motor housing, returning the debris to the room from which it was removed. To reduce the number of particles entrained within the air exiting therefrom, vacuum cleaners are typically provided with a filter element located downstream of the filter bag either between the filter bag and the vacuum motor or downstream of the vacuum motor, such as in an exhaust air stream thereof. The Westergren '430 patent discloses the use of such a filter element to capture particles escaping the filter bag.

Unfortunately, these filter elements become clogged when a sufficient number of particles are trapped thereon which also reduces the cleaning efficiency of the vacuum cleaner. A user may mistakenly replace the filter bag instead of a clogged filter element when the user determines that the cleaning efficiency of the vacuum cleaner is reduced. Although replacement of a clogged filter bag causes a substantial increase in the effectiveness of the vacuum cleaner, an optimum level of performance is not reached if the downstream filter element is also clogged. Further, it is difficult for a user to ascertain the condition of the filter element and to determine whether either, or both, of the filter bag and filter element have become clogged.

SUMMARY OF THE INVENTION

According to the invention, a vacuum cleaner comprises a housing having a floor-engaging nozzle fluidly interconnected with a filter bag in a closed filter bag chamber in the housing through a suction passageway. A vent in the filter bag chamber exhausts filtered air exiting from the filter bag chamber. A vacuum motor in the housing is operably coupled to the suction passageway to draw dirty air through the floor-engaging nozzle and to pass the dirty air through the filter bag. An exhaust filter is mounted in the exhaust vent and a sensor is operably connected to the filter bag chamber to detect a condition representative of the flow of air through the exhaust filter element. An exhaust filter indicator is interconnected with the sensor for generating a signal when the condition reaches a predetermined level.

The filter bag chamber can comprise a first chamber and a second chamber interconnected through the vacuum motor and the exhaust vent and the sensor are in the second chamber. The sensor preferably comprises a pressure sensor. A filter bag sensor is preferably located in the first chamber which is adapted to detect a condition representative of the flow of air through the filter bag. A filter bag indicator is preferably interconnected with the filter bag sensor for generating a signal when the condition sensed by the filter bag sensor reaches a predetermined level. The filter bag sensor can also be a pressure sensor. The exhaust filter indicator and the filter bag indicator can include a diaphragm switch. The filter bag sensor comprises a first sensor to detect the pressure within the filter bag, a second sensor to detect the pressure outside the filter bag but within the first chamber and the filter bag indicator is interconnected with the first and second sensors to measure the differential pressure therebetween. The second sensor can be interconnected with the exhaust filter indicator and the exhaust filter indicator measures the differential pressure between the first and second chambers and/or the atmosphere. The vacuum motor can be positioned between the first and second chambers. The housing preferably comprises a base including the floor-engaging nozzle and a handle pivotally mounted to the base which includes the closed filter bag chamber. The exhaust filter sensor can also be an air speed sensor or a temperature sensor which measures an increase in the temperature of the motor. The exhaust filter indicator is preferably mounted to the housing and to the exhaust filter.

In another embodiment of the invention, the vacuum cleaner comprises a base having a floor-engaging nozzle, a handle pivotally mounted to the base having a first chamber fluidly interconnected with a second chamber. A filter bag is mounted in the first chamber and is fluidly interconnected with the floor-engaging nozzle by a suction passageway. An exhaust vent is located in the second chamber to exhaust filtered air exiting from the first chamber and an exhaust filter is mounted in the exhaust vent. A vacuum motor is provided in one of the housing and the base to draw air from the floor-engaging nozzle to the filter bag. A first indicator is provided on one of the housing and the base interconnected to at least one of the suction passageway and the first chamber to generate a signal representative of the flow of air through the filter bag at a predetermined level. A second indicator is provided on one of the housing and the base interconnected to at least one of the first and second chambers to generate a signal representative of the flow of air through the exhaust filter at a predetermined level. Thus, a clogged condition of one or both of the filter bag and exhaust filter can be detected.

BRIEF DESCRIPTION OF THE DRAWINGS

The invention will now be described with reference to the drawings in which:

FIG. 2 is a schematic view of a fill tube portion of the vacuum cleaner of FIG. 1 showing the interconnections of the indicators of FIG. 1 with various chambers of the vacuum cleaner;

FIG. 3 is an example of a switch used in the indicators shown in the vacuum cleaner of FIG. 1;

FIG. 4 is a cross-sectional view of a first embodiment of the switch shown by example in FIG. 3 in an open position;

FIG. 5 is a cross-sectional view of the indicator switch of FIG. 4 shown in a closed position;

FIG. 6 is an enlarged, fragmentary view of the fill tube of FIG. 2 showing the mounting of the switch of FIG. 3 to a chamber of the fill tube of FIG. 2 between the motor and a filter element therefor;

FIG. 7 is a side elevational view of a second embodiment of a switch used in the indicators for the upright vacuum cleaner of FIG. 1;

FIG. 8 is a fragmentary, cross-sectional view of the second embodiment of the switch shown in FIG. 7 in an open position; and FIG. 9 is a fragmentary, cross-sectional view of the switch shown in FIG. 7 in a closed position.

DETAILED DESCRIPTION OF THE PREFERRED EMBODIMENTS

Figure 1:
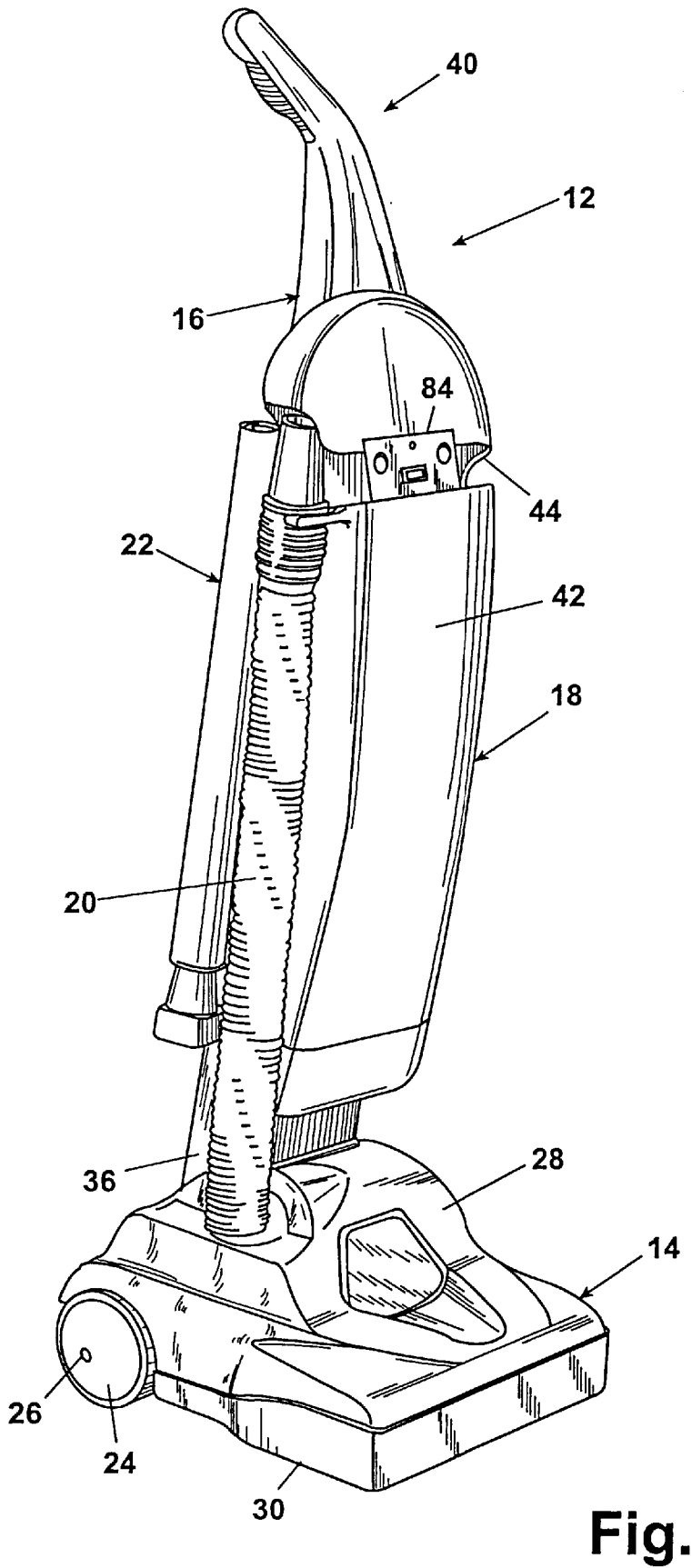
FIG. 1 is a perspective view of an upright vacuum cleaner having full bag and clogged filter indicators according to the invention.

Referring now the drawings and to FIGS. 1–2 in particular, an upright vacuum cleaner 12 comprises a floor-engaging foot 14 and an upwardly-extending handle assembly 16 pivotally mounted thereto. Although the description of the invention relates to an upright vacuum cleaner, the concepts embodied in this invention can also be applied to canister vacuum cleaners and other suction-powered cleaners. A bag housing 18 is mounted to the handle assembly 16 which preferably comprises a housing molded from a rigid material, such as a synthetic resin. A flexible hose 20 and an accessory wand 22 are removably mounted to the upright vacuum cleaner 12 for typical above-the-floor cleaning operations. The foot 14 can also be pushed along a floor surface on wheels 24 which are rotatably mounted to the foot 14 by pins 26.

The foot 14 comprises a cover 28 typically removably mounted to a base pan 30, which cooperate to receive the wheels 24 and the pins 26 for rollably supporting a rear portion of the vacuum cleaner 12. A pair of lift wheels (not shown) are typically provided at a central portion of the base pan 30 and are adapted to lift a front portion of the foot 14 away from the floor surface when the handle assembly 16 is moved to an upright position. A mechanism for manually adjusting the operating height of an agitator brush (not shown) with respect to the floor surface can also be provided to adapt the vacuum cleaner 12 to optimally clean a variety of floor surfaces, such as a bare floor, thin carpet, shag carpet, etc.

The handle assembly 16 comprises a handle base 36, a fill tube 38, a handle 40 and an access panel 42. These components are preferably formed as rigid components formed from a synthetic resin material. The handle base 36 is preferably pivotally mounted to the foot 14 in which fluidly communicates with a suction passage (not shown) which extends forwardly in the foot 14 to the agitator brush so that loosened debris travels through the suction passage and into the handle base 36.

The fill tube 38 comprises a housing 44 which defines an internal bagreceiving chamber 46. A lower wall 48 is preferably provided with an aperture 50 therein. A rear wall 52 of the fill tube 38 preferably defines a vertically-extending conduit 54 having a first end cooperating with the handle base 36 and a second end terminating at a bag retainer 56. The bag retainer 56 preferably comprises a spout 58 which cooperates with the conduit 54 and a pair of retainers 60 adapted to removably mount a typical filter bag 62. The filter bag 62 typically comprises a porous container 64 having a plate 66 with an aperture 68 provided therein. The aperture 68 of the filter bag 62 is passed over the spout 58 so that the conduit 54 is fluidly interconnected with the interior of the container 64 and the plate 66 is held against the spout 58 by the retainer 60.

The lower wall 48 cooperates with outer walls of the fill tube 38 to define a motor-receiving chamber 70 at a lower portion thereof which has an aperture 72 located within a side wall 74 of the fill tube 38. The aperture 72 defines a vent 76 in which a filter element 78 is mounted. The filter element 78 preferably is a porous member having a porosity smaller than that of the container 64 of the filter bag 62 so that smaller particles escaping through the pores of the container 64 are captured by the filter element 78.

A vacuum motor 80 is positioned within the chamber 70 and has an inlet port 82 aligned with the aperture 50 in the lower wall 48 of the fill tube 38. The motor 80, when actuated, draws air through the handle base 36, through the conduit 54, into the spout 58 where debris entrained within the suctioned air is preferably contained within the container 64. In actuality, some smaller particles escape through the pores of the container 64 of the filter bag 62 and enter into the inlet port 82 of the vacuum motor 80. The vacuum motor 80 then exhausts air, often with the entrained smaller particles therein, through the vent 76 in the side wall 74 of the fill tube 38 wherein the filter element 78 captures particles remaining in the air stream.

It will be understood that, although a clean-air system is shown in the drawings, the teachings of this invention as described below can also be used with a dirty-air system whereby the vacuum motor 80 would be repositioned upstream of the handle base 36 so that the vacuum motor blows the suctioned air from the foot 14 into the spout 58 and, in turn, into the filter bag 62. The filtered air then passes through a filtered vent in the filter bag housing.

After some time, a sufficient amount of debris accumulates within the container 64 of the filter bag 62, requiring a user to remove the access panel 42 and install a new filter bag 62 on the retainer 60 over the spout 58. In addition, a sufficient number of particles can be captured by the filter element 78 to make it necessary to remove the dirty filter element 78 and to install a new filter element 78 within the vent 76 of the fill tube 38.

When the filter bag 62 and filter element 78 become clogged, the vacuum motor 80 must apply additional suction to the filter bag 62 to pull the debris in the conduit 54 into the container 64 thereof. As additional debris accumulates in the container 64, the vacuum motor 80 must work even harder to produce the required suction. Eventually, the amount of debris within the container 64 becomes too great and the vacuum motor 80 is no longer able to provide a sufficient degree of suction to the filter bag 62 reducing the effectiveness of the vacuum cleaner 12. In addition, when the filter element 78 becomes clogged, the vacuum motor 80 is no longer able to exhaust sufficient air through the vent 76 because of the substantial number of particles located on the filter element 78 which obstruct the path of air through the filter element 78.

An indicator device 84 comprises a housing 86 mounted to an upper portion of the fill tube 38 having first and second indicators 88 and 90 provided thereon which provide an indication of the clogged condition of the filter bag 62 and the filter element 78, respectively. The indicators 88 and 90 typically comprise a lamp which is illuminated when the filter bag 62 and/or filter element 78 are sufficiently clogged to substantially reduce the effectiveness of the vacuum cleaner 12 and require cleaning or replacement. Alternatively, the indicators 88 and 90 can provide an audible signal as well as a combined audible and visual signal. First, second and third sensors, such as conduits 92, 94 and 96, respectively, are interconnected between the housing 86 and the fill tube 38. Specifically, the first conduit 92 is interconnected with an area of the bag-receiving chamber 46 located between the inner wall of the housing 44 and the filter bag 62. The second conduit 94 is interconnected with an upper portion of the conduit 54 adjacent the spout 58. The third conduit 96 is interconnected with the interior of the motor-receiving chamber 70 between the motor 80 and the interior of the fill tube 38.

The first conduit 92 is adapted to sense a pressure $P_2$ in the bag chamber, the second conduit 94 is adapted to sense a pressure $P_2$ inside the filter bag 62 and the third conduit 96 is adapted to sense a pressure $P_3$ inside the chamber 70.

The filled condition of the filter bag 62 and the filter element 78 can be sensed by either determining when the pressure differential between the inside and outside of each component reaches a predetermined value, or determining when the pressure either inside or outside each component reaches a predetermined value depending upon the clogged condition of the filter bag 62 and the filter element 78.

FIGS. 3–5 show an example of an indicator for sensing the pressure differential across the filter bag 62 or the filter element 78. The indicator comprises a housing 100 divided into first and second chambers 102 and 104 by a flexible diaphragm 106. A lamp 108 is supported on one side of the housing 100 and includes first and second terminals 110 and 112. The first terminal 110 extends downwardly into the chamber 104 adjacent to the diaphragm 106, as shown in FIG. 4. The second terminal 112 extends downwardly into the chamber 104 and outwardly through a sidewall of the housing 100. The diaphragm 106 supports a contact plate 114 which includes a terminal 116 which extends out of the housing 100 adjacent the second terminal 112.

A first port 118 and a second port 120 extend downwardly from the housing 100 and define internal conduits 122 and 124 which are fluidly interconnected with the first and second chambers 102 and 104, respectively, located on either side of the diaphragm 106.

The first conduit 92 is preferably interconnected with the first port 118 and the second conduit 94 is preferably interconnected with the second port 120 to arrange the indicator 88 to detect a pressure differential between the interior and exterior of the filter bag 62. In addition, an additional indicator 90 can be provided which has the third conduit 96 interconnected with the first port 118 and the second port 120 exposed to the ambient atmosphere to configure the indicator 90 to detect the pressure difference across the filter element 78 to determine the clogged condition thereof. Alternatively, the ports 118 and 120 of the second indicator 90 can be interconnected to the second conduit 94 and to the third conduit 96 to detect a pressure differential across the vacuum motor 80 instead of across the filter element 78.

In operation, each indicator 88 and 90 is interconnected with a portion of the fill tube 38 as described above. The first indicator 88, as shown in FIG. 4, is normally positioned in an open position whereby the first terminal 110 of the lamp 108 is spaced from the contact plate 114 of the diaphragm 106. When the pressure differential between the first and second conduits 92 and 94 reaches a predetermined value, the pressure in the first chamber 102 of the housing 100 is defined through the first conduit 92. The pressure in first port 118 acts against the diaphragm 106 and urges the diaphragm 106 toward the second chamber 104. The contact plate 114 on the diaphragm 106 thereby contacts the first terminal 110 depending from the lamp 108 and completes a connection between the first terminal 110 of the lamp 108 and the terminal 116 of the contact plate 114. It will be understood that the terminals 112 and 116 are interconnected with an appropriate electrical circuit (not shown) to deliver electricity to the lamp 108. Thus, the lamp 108 is illuminated when the pressure differential between the interior and exterior of the filter bag 62 reaches a predetermined value. The second indicator 90 works in a similar fashion to detect the pressure differential across either the motor 80 or the filter element 78.

Measurement of the pressure differential across the filter bag 62 or the filter element 78 is effective in eliminating false indications of a clogged filter bag 62 or filter element 78 as a result of an upstream clog in the vacuum cleaner 12. In prior art for filter bag indicators, the full bag indicator could be falsely tripped by a clog in the vacuum cleaner nozzle or attachment hose which, because the prior art full bag indicators typically measured a pressure difference between the bag chamber and atmosphere, the upstream clog in the vacuum cleaner nozzle or attachment hose caused a pressure drop in the bag chamber as well, often falsely tripping the indicator. The indicators 88 and 90 for the filter bag 62 and filter element 78 measure a pressure differential, in this embodiment, across the filter bag 62 or the filter element 78 so that upstream clogs in the vacuum cleaner 12 do not cause the indicators 88 and 90 to be falsely actuated.

A second embodiment of the indicators 88 and 90 is shown in FIGS. 6–9 whereby the indicators 88 and 90 comprise a housing 130 interconnected with a chamber of the fill tube 38 vacuum cleaner 12 by a single conduit. The housing 130 is divided into first and second chambers 132 and 134 by a diaphragm 136. A lamp 138 is mounted to the housing 130 and has a first terminal 140 interconnected to the lamp 138 for interconnection with a source of electricity. The lamp 138 also has a second terminal 142 formed in two portions: a first portion interconnected with the lamp 138 and extending into the first chamber 132 of the housing 130 and a second portion comprising a contact plate 144 located within the first chamber 132 extending along, and movable with, the diaphragm 136.

A port 146 extends downwardly from the housing 130 and defines an internal conduit 148 which is fluidly interconnected with the second chamber 134. The internal conduit 148 of the port 146 is fluidly interconnected to the conduit 96 so that the second chamber 134 is fluidly interconnected with the interior of the motor chamber 70. The internal conduit 148 of another indicator can be interconnected to the interior of the bag-receiving chamber 46.

In operation, the diaphragm 136 is normally biased to an open position as shown in FIG. 8 whereby the first terminal 140 does not touch the contact plate 144 of the second terminal 142 thus leaving the lamp 138 in an unilluminated state. As the filter element 78 becomes clogged, the pressure $P_3$ within the motor chamber 70 rises a sufficient degree until the pressure $P_3$ reaches a predetermined value and urges the diaphragm 136 to the closed position as shown in FIG. 9. The contact plate 144 on the second terminal 142 is thereby urged against the first portion of the second terminal 142 so that the circuit is closed between the first and second terminals 140 and 142. The lamp 138 is thereby interconnected with the source of electricity to illuminate the lamp 138 and provides a warning to the user of the clogged condition of the filter element 78.

The indicator shown in FIG. 7–9 can also be interconnected with the chamber 46 of the fill tube 38 to detect the pressure $P_1$ or $P_2$ of the interior or exterior of the filter bag 62, respectively, to close the circuit between the first and second terminals 140 and 142 when the pressure $P_1$ or $P_2$ reaches a predetermined value to indicate the clogged condition of the filter bag 62.

Although the sensors 92–96 are disclosed herein as adapted to sense a pressure $P_1$, $P_2$ and $P_3$ at various locations within the housing 18, other types of sensors adapted to detect a particular condition representative of the flow of air through either the filter bag 62 or the filter element 78 can be used without departing from the scope of this invention. These alternative types of sensors can be adapted to detect air speed, temperature or other conditions of the air flow through the bag housing 18. Additionally, mechanical devices, such as movable air vanes, movable upon an increase or decrease in the air flow through the bag housing 18, weight-actuated scales actuated upon the change in the weight of the filter bag 62 or filter element 78, or other mechanical linkages or devices can also be employed without departing from the scope of this invention.

Although the second indicator 90 is shown interconnected to various portions of the bag housing 18 adjacent to the filter element 78, the second indicator 90 can be integral with the filter element 78. For example, a filter can be provided with a valve through which air flow is diverted when the filter element 78 becomes clogged whereby the valve is adapted to provide a whistling sound to alert a user of the clogged condition of the filter element 78. Alternatively, the filter element 78 can be provided with a visual indicator, such as a flexible diaphragm which expands outwardly when the air flow through, or pressure deferential across the filter element 78 reaches a predetermined level. These types of filter elements, when clogged, can be removed and replaced with a new filter element or removed and cleaned as needed.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. A vacuum cleaner comprising:
   a housing having a floor-engaging nozzle fluidly interconnected with a filter bag in a closed filter bag chamber in the housing through a suction passageway;
   an exhaust vent in the filter bag chamber to exhaust filtered air exiting from the filter bag chamber;
   a vacuum motor in the housing operably coupled to the suction passageway to draw dirty air through the floor-engaging nozzle and for passing the dirty air through the filter bag;
   an exhaust filter mounted in the exhaust vent;
   a sensor operably connected to the filter bag chamber to detect a condition representative of the flow of air through the exhaust filter element; and
   an exhaust filter indicator interconnected with the sensor for generating a signal when the condition reaches a predetermined level.

2. The vacuum cleaner of claim 1 wherein the filter bag chamber comprises a first chamber and a second chamber interconnected through the vacuum motor and the exhaust vent and the sensor are in the second chamber.

3. The vacuum cleaner of claim 2 wherein the sensor comprises a pressure sensor.

4. The vacuum cleaner of claim 3 and further comprising:
   a filter bag sensor in the first chamber adapted to detect a condition representative of the flow of air through the filter bag; and
   a filter bag indicator interconnected with the filter bag sensor for generating a signal when the condition sensed by the filter bag sensor reaches a predetermined level.

5. The vacuum cleaner of claim 4 wherein the filter bag sensor is a pressure sensor.

6. The vacuum cleaner of claim 5 wherein the exhaust filter indicator includes a diaphragm switch.

7. The vacuum cleaner of claim 6 wherein the filter bag indicator includes a diaphragm switch.

8. The vacuum cleaner of claim 7 wherein the filter bag sensor comprises:
   a first sensor to detect the pressure within the filter bag;
   a second sensor to detect the pressure outside the filter bag but within the first chamber; and
   the filter bag indicator is interconnected with the first and second sensors and measures the differential pressure therebetween.

9. The vacuum cleaner of claim 8 wherein the second sensor is interconnected with the exhaust filter indicator and the exhaust filter indicator measures the differential pressure between the first and second chambers.

10. The vacuum cleaner of claim 9 wherein the vacuum motor is positioned between the first and second chambers.

11. The vacuum cleaner of claim 9 wherein the housing comprises:
    a base including the floor-engaging nozzle; and
    a handle pivotally mounted to the base and including the closed filter bag chamber.

12. The vacuum cleaner of claim 1 wherein the exhaust filter sensor is an air speed sensor.

13. The vacuum cleaner of claim 1 wherein the exhaust filter sensor is a temperature sensor which measures an increase in the temperature of the motor.

14. The vacuum cleaner of claim 1 wherein the exhaust filter indicator is mounted to the housing.

15. The vacuum cleaner of claim 1 wherein the exhaust filter indicator is mounted to the exhaust filter.

16. The vacuum cleaner of claim 1 wherein the sensor comprises a pressure sensor.

17. The vacuum cleaner of claim 1 and further comprising:
   a filter bag sensor in the filter bag chamber adapted to detect a condition representative of the flow of air through the filter bag; and
   a filter bag indicator interconnected with the filter bag sensor adapted to generate a signal when the condition sensed by the filter bag sensor reaches a predetermined level.

18. The vacuum cleaner of claim 17 wherein the filter bag sensor is a pressure sensor.

19. The vacuum cleaner of claim 17 wherein the filter bag indicator includes a diaphragm switch.

20. The vacuum cleaner of claim 17 wherein the filter bag sensor comprises:
   a first sensor adapted to detect the pressure within the filter bag;
   a second sensor to detect the pressure outside the filter bag but within the filter bag chamber; and
   the filter bag indicator is interconnected with the first and second sensors and measures the differential pressure therebetween.

21. The vacuum cleaner of claim 1 wherein the exhaust filter indicator includes a diaphragm switch.

22. The vacuum cleaner of claim 1 wherein the closed filter bag chamber comprises a first chamber having the filter bag and a second chamber having the exhaust filter element, wherein the sensor comprises a first sensor operably connected to the first chamber to detect a first condition representative of the flow of air therethrough and a second sensor operably connected to the second chamber to detect a second condition representative of the flow of air therethrough and the exhaust filter indicator measures the differential between the first and second detected conditions whereby the differential provides a reliable indication of whether the filter bag and/or the exhaust filter are clogged.

23. The vacuum cleaner of claim 22 wherein the vacuum motor is positioned between the first and second chambers.

24. The vacuum cleaner of claim 1 wherein the housing comprises:
   a base including the floor-engaging nozzle; and
   a handle pivotally mounted to the base and including the closed filter bag chamber.

25. A vacuum cleaner comprising:
   a base having a floor-engaging nozzle;
   a handle pivotally mounted to the base having a first chamber fluidly interconnected with a second chamber;
   a filter bag mounted in the first chamber and fluidly interconnected with the floor-engaging nozzle by a suction passageway;
   an exhaust vent in the second chamber to exhaust filtered air exiting from the first chamber;
   an exhaust filter mounted in the exhaust vent;
   a vacuum motor provided in one of the housing and the base to draw air from the floor-engaging nozzle to the filter bag;
   a first indicator on one of the housing and the base interconnected to at least one of the suction passageway and the first chamber to generate a signal representative of the flow of air through the filter bag at a predetermined level; and
   a second indicator on one of the housing and the base interconnected to at least one of the first and second chambers to generate a signal representative of the flow of air through the exhaust filter at a predetermined level;
   whereby a clogged condition of one or both of the filter bag and exhaust filter can be detected.

* * * * *